US012661727B2

(12) United States Patent
Lamb

(10) Patent No.: US 12,661,727 B2
(45) Date of Patent: Jun. 23, 2026

(54) TUBING CUTTER AND METHODS TO CUT SPINE-FIN TUBING AND COUPLE A HEADER TUBE TO SPINE-FIN TUBING

(71) Applicant: Arrow Fabricated Tubing, Inc., Garland, TX (US)

(72) Inventor: Kenneth Ray Lamb, Sachse, TX (US)

(73) Assignee: Arrow Fabricated Tubing, Inc., Garland, TX (US)

( * ) Notice: Subject to any disclaimer, the term of this patent is extended or adjusted under 35 U.S.C. 154(b) by 0 days.

(21) Appl. No.: 19/087,338

(22) Filed: Mar. 21, 2025

(65) Prior Publication Data

US 2025/0296161 A1     Sep. 25, 2025

Related U.S. Application Data

(60) Provisional application No. 63/569,135, filed on Mar. 23, 2024.

(51) Int. Cl.
B23D 21/10     (2006.01)
B21D 53/06     (2006.01)
F28F 9/02     (2006.01)

(52) U.S. Cl.
CPC ............. B23D 21/10 (2013.01); B21D 53/06 (2013.01); F28F 9/0246 (2013.01)

(58) Field of Classification Search
CPC ................................ B23D 21/06; B23D 21/10
See application file for complete search history.

(56) References Cited

U.S. PATENT DOCUMENTS

| | | | | |
|---|---|---|---|---|
| 1,529,489 | A | * | 3/1925 | Leipold .................. B23D 21/10 |
| | | | | 30/349 |
| 4,048,834 | A | * | 9/1977 | Durbin ................... B21D 53/06 |
| | | | | 29/890.046 |
| 2015/0340849 | A1 | * | 11/2015 | Kochi ...................... A01G 3/02 |
| | | | | 30/251 |

FOREIGN PATENT DOCUMENTS

CN          211682230 U   * 10/2020

OTHER PUBLICATIONS

English translation CN211682230 (Year: 2020).*

* cited by examiner

*Primary Examiner* — Jason L Vaughan
*Assistant Examiner* — Amanda Kreiling
(74) *Attorney, Agent, or Firm* — The Hilton Firm PLLC

(57) ABSTRACT

A tubing cutter configured to cut spine-fin tubing includes a pair of cutting heads pivotally connected and movable between an open position and a closed position. Each cutting head of the tubing cutter includes a blade edge having an arcuate portion with a radius less than an outer radius of a tube of the spine-fin tubing.

18 Claims, 10 Drawing Sheets

TUBING CUTTER AND METHODS TO CUT SPINE-FIN TUBING AND COUPLE A HEADER TUBE TO SPINE-FIN TUBING

CROSS-REFERENCE TO RELATED APPLICATIONS

This application claims the benefit of and priority to U.S. Provisional Application No. 63/569,135, filed Mar. 23, 2024, which is hereby incorporated by reference in its entirety.

BACKGROUND

1. Field

The disclosure relates generally to tubing cutters and methods to cut spine-fin tubing and couple a header tube to spine-fin tubing in a fluid circulation system such as a heat exchanger.

2. Description of Related Art

Heat exchangers in residential and commercial heating and cooling systems allow the transfer of heat to or from fluids such as refrigerant. Most systems employ condenser coils and evaporator coils in these heat exchangers. The coils typically include an array of tubing that carries and exposes the refrigerant to air or other fluids that are routed over the outside of the tubing. The exchange of heat between the external air or fluids and the refrigerant inside the tubing occurs due in part to the thermal conductivity of the tubing. In some instances, fins or other structural supports are positioned in contact with the tubes to further improve the heat transfer properties associated with the heat exchanger. In many cases, the tubes are arranged in rows or columns and are fluidly coupled to provide a continuous fluid path through the tubes.

SUMMARY

The problems presented by existing tubing cutters and methods to cut spine-fin tubing and couple a header tube to spine-fin tubing are solved by the systems and methods described herein. In one illustrative embodiment, a tubing cutter is provided to cut spine-fin tubing. The tubing cutter includes a pair of cutting heads pivotally connected and movable between an open position and a closed position. Each cutting head includes a blade edge having an arcuate portion with a radius less than an outer radius of a tube of the spine-fin tubing.

In another embodiment, a tubing cutter configured to cut spine-fin tubing includes a first cutting head pivotally coupled to a second cutting head. Each of the first cutting head and the second cutting head have a blade edge with an arcuate portion. The tubing cutter further includes a guide coupled to the first cutting head. The guide includes a guide surface configured to engage a plurality of fins radially extending from a tube of the spine-fin tubing. The guide aids in alignment of the blade edge with the tube.

In yet another embodiment, a method of cutting spine-fin tubing is provided, the spine-fin tubing having a tube with a plurality of fins extending radially outward from the tube. The method includes positioning a guide of a tubing cutter along an exterior of the plurality of fins to align a pair of opposing blade edges relative to the tube. The blade edges are moved toward the tubing such that the blade edges contact the tube in four initial points of contact prior to cutting the tube. The tubing is cut tubing with the blade edges.

In another embodiment, a method of coupling a header tube to spine-fin tubing is provided, the spine-fin tubing having a plurality of fins extending radially outward from a tube of the spine-fin tubing. The method includes positioning a guide of a tubing cutter along an exterior of the plurality of fins to align a pair of opposing blade edges relative to the tube of the spine-fin tubing. The tube of the spine-fin tubing is cut with a blade edge of the tubing cutter, and the header tube is moved into contact with a freshly cut edge of the tube of the spine-fin tubing. The header tube and the tube of the spine-fin tubing are crimped together.

Other objects, features, and advantages of the illustrative embodiments will become apparent with reference to the drawings, detailed description, and claims that follow.

DETAILED DESCRIPTION

Figure 1:
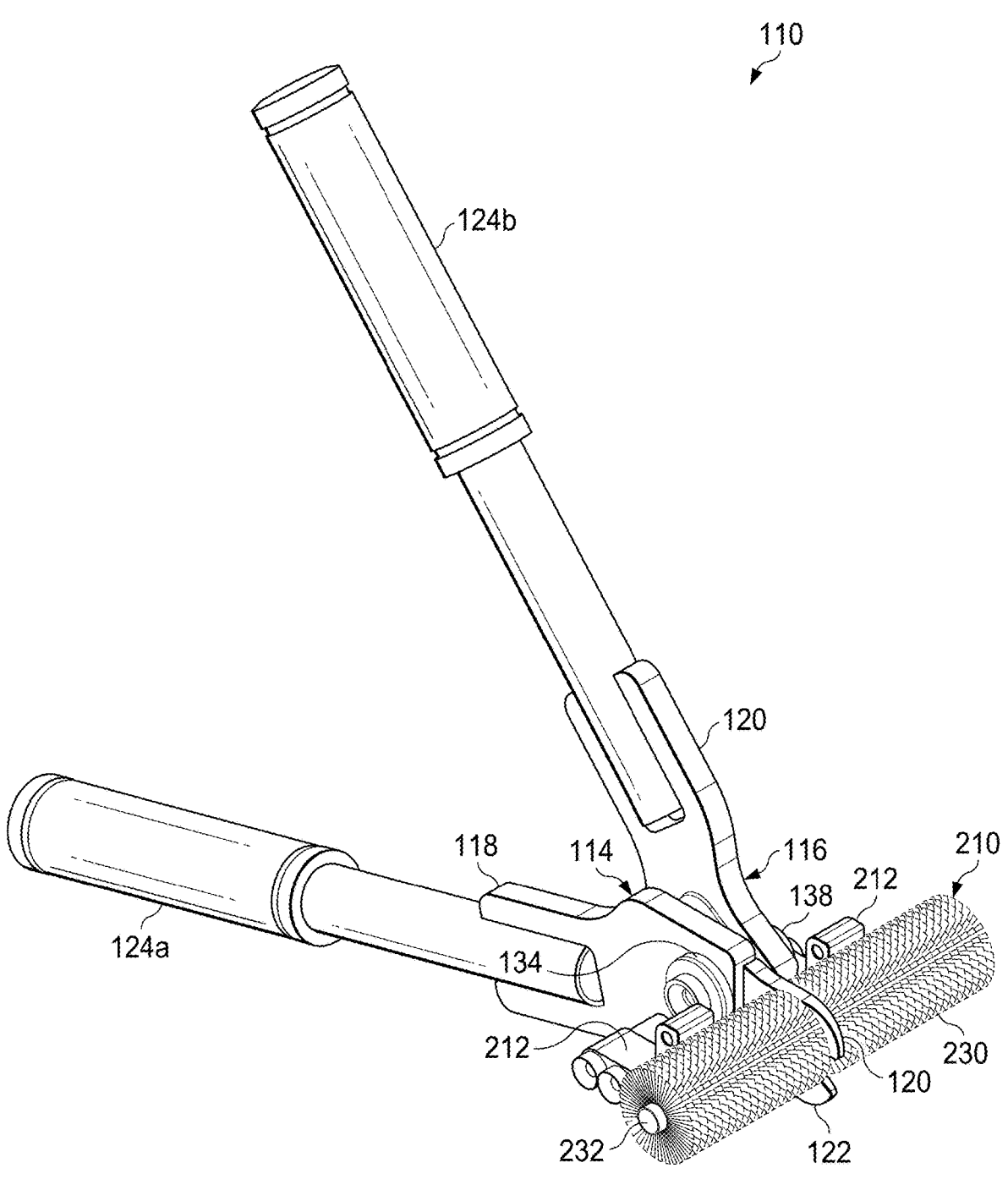
FIG. 1 illustrates an isometric view of a tubing cutter according to an illustrative embodiment in an open position and aligned to cut a length of spine-fin tubing.

In the following detailed description of several illustrative embodiments, reference is made to the accompanying drawings that form a part hereof, and in which is shown by way of illustration specific embodiments in which the invention may be practiced. These embodiments are described in sufficient detail to enable those skilled in the art to practice the invention, and it is understood that other embodiments may be utilized and that logical structural, mechanical, electrical, and chemical changes may be made without departing from the spirit or scope of the invention. To avoid detail not necessary to enable those skilled in the art to practice the embodiments described herein, the description may omit certain information known to those skilled in the art. The following detailed description is, therefore, not to be taken in a limiting sense, and the scope of the illustrative embodiments are defined only by the appended claims.

Unless otherwise specified, any use of any form of the terms "connect," "engage," "couple," "attach," or any other term describing an interaction between elements is not meant to limit the interaction to direct interaction between the elements and may also include indirect interaction between the elements described. In the following discussion and in the claims, the terms "including" and "comprising" are used in an open-ended fashion, and thus should be interpreted to mean "including, but not limited to". Unless otherwise indicated, as used throughout this document, "or" does not require mutual exclusivity.

As used herein, the phrases "hydraulically coupled," "hydraulically connected," "in hydraulic communication," "fluidly coupled," "fluidly connected," and "in fluid communication" refer to a form of coupling, connection, or communication related to fluids, and the corresponding flows or pressures associated with these fluids. In some embodiments, a hydraulic coupling, connection, or communication between two components describes components that are associated in such a way that fluid pressure may be transmitted between or among the components. Reference to a fluid coupling, connection, or communication between two components describes components that are associated in such a way that a fluid can flow between or among the components. Hydraulically coupled, connected, or communicating components may include certain arrangements where fluid does not flow between the components, but fluid pressure may nonetheless be transmitted such as via a diaphragm or piston or other means of converting applied flow or pressure to mechanical or fluid force.

The present disclosure relates generally to the field of cutting devices, and specifically to cutting devices used to cut tubing or thin-walled pipe or conveyances. Much of the tubing used in the environmental cooling space is thin-walled tubing made from aluminum, copper, or other metals or material with high thermal conductivity properties. This tubing, when used in heat exchangers such as air conditioning condenser coils or evaporator coils, allows for efficient heat transfer and thus the desired amount of cooling or heating of the fluid that passes through the tubing. In some heat exchangers, the transfer of heat is improved by passing the tubing through parallel arrangements of fins through which air or other fluids are passed. The fins effectively increase the surface area of the tubing, thereby improving heat transfer. Other heat exchangers may dispense with the parallel, rigid fins, and instead use spine-fin tubing. Spine-fin tubing includes a centrally located tube with an arrangement of metal or other thermally conductive fins that extend radially outward from the tube. Spine-fin tubing is created by first manufacturing the fins and then winding them around the tube in a dense arrangement that places the fin material in contact with the tube, thus allowing for conductive heat transfer between the tube and fins.

Spine-fin tubing is commonly used in certain air conditioning condenser units. After manufacturing the spine-fin tubing, the spine-fin tubing is wound into a continuous coil in an efficient process that shapes the coil to fit within a condenser housing. The condenser, prior to use in a refrigerant-based air conditioning system, must be connected to the rest of the system. Connecting to the tubing coil is typically accomplished by cutting the spine-fin tubing at regular intervals in the coil and coupling a header or manifold to the tubing. This header allows distribution of fluid from the air conditioning system at several locations within the coils which improves overall heat transfer.

The spine-fin configuration of the coil presents challenges for connecting the header tubing (or any tubing) to the coil. The presence of the spine-fins along the tubing makes cutting the spine-fin tubing difficult, and typical cutting methods result in asymmetric cuts that also deform the tubing. For example, it is current practice by technicians to use tin snips or other instruments that have two flat blade edges that come together to sever the tube. This practice changes the cross-sectional profile of the tube, deforming the tube into a profile that is no longer circular. It also creates sharp edges on the ends of the severed tube. Because of this deformation and the sharp edges, manipulation and reaming of the tube is required, which still does not return the tube to its original profile. When a condenser coil with spine-fin tubing is cut for attachment to a header tubing, the header tubing is brazed to the cut end of the spine-fin tubing. These processes-cutting the tubing, reaming of the deformed tubing end, and brazing of the header tubing to the spine-fin tubing-require more time and cost than other connection methods such as crimping. However, the crimping of two tubes requires one of the tubes to have a flared tubing end with an o-ring that can be easily damaged if the tube inserted into the flared tubing end is sharp or the profile is misshapen.

The current cutting practices and associated instruments for cutting spine-fin tubing substantially reduce the likelihood of success of crimping a header tube onto a freshly cut end of spine-fin tubing, and this is why attachment methods are currently limited to brazing. If crimping were to be used, the header tube would include the flared end and requisite o-ring or seal, but it is important that the spine-fin tubing be cut with minimal deformation and that the cut be clean and straight, thus substantially reducing the formation of sharp edges. Further it is desired that the tubing be cut without removing a section of the spine fins prior to the cutting process, which is an additional step that requires additional time and cost.

A tubing cutter is described herein that includes a first cutting head pivotally connected to a second cutting head, where the cutting heads are movable between open and closed positions. The cutting heads each include a blade edge with both arcuate and linear portions, which improves the cut made by the tubing cutter. This reduces the presence of burrs (or sharp edges) on the ends of the cut tubing and also reduces the deformation of the tube keeping the tube profile substantially round. The tubing cutter may also include a guide with a guide surface that contacts the spine fins prior to cutting, thereby aligning the cutting heads with the tube at a normal angle and ensuring a cut that is substantially perpendicular to the longitudinal axis of the tube.

Figure 2A:
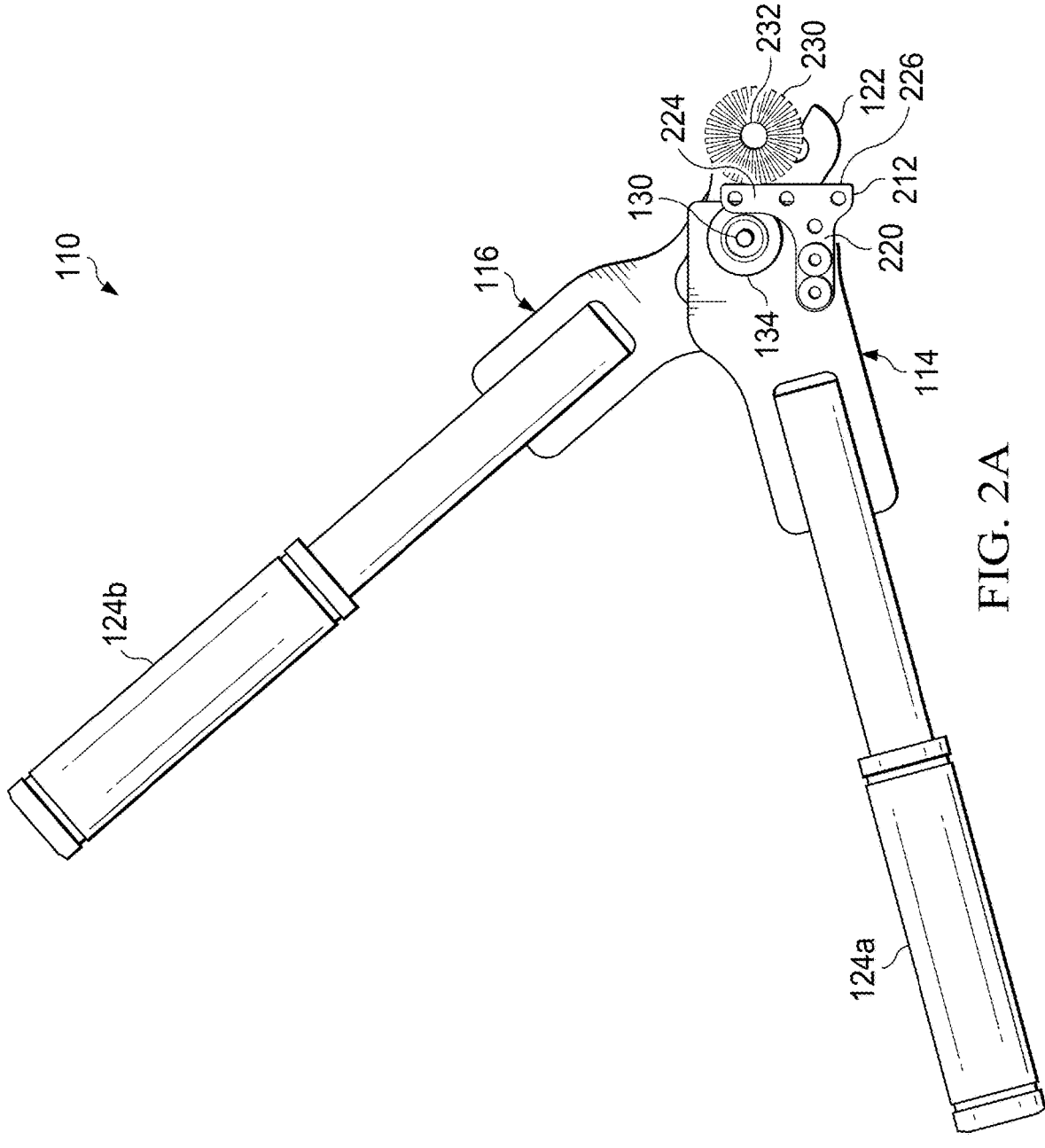
FIG. 2A illustrates a side view of the tubing cutter and spine-fin tubing of FIG. 1, the tubing cutter having a guide with a planar guide surface.

FIGS. 1 and 2A illustrate isometric and side views of a tubing cutter 110 in an open position positioned proximate a length of spine-fin tubing 210. Spine-fin tubing 210 includes a plurality of spine fins 230 extending radially outward from a tube 232. The tubing cutter 110 includes a first cutting head 114 pivotally connected to a second cutting head 116. In the embodiment illustrated in FIG. 1, the first cutting head 114 includes an elongated body 118 removably coupled to a blade 120. Similarly, the second cutting head 116 includes an elongated body 120 removably coupled to a blade 122. In some embodiments, the body and blade of each cutting head may be integrally connected and not removably connected; however removable connection allows for blade customization to permit use with different tubing sizes or shapes.

A handle 124a, 124b is coupled to each of the first cutting head 114 and the second cutting head 116, respectively. The first and second cutting heads 114, 116 are pivotally coupled to one another by an axle 130 such that the blades 120, 122 may rotate relative to one another about the axle 130. The axle 130 may be a pin, a bolt, or other fastener that allows such rotation. In one embodiment, the axle 130 may be a fastener that is passed through one or more bushings or washers 134 positioned on a side of the first cutting head 114. The fastener may also pass through both of the cutting heads 114, 116 and through one or more second bushings or washers 138 positioned on a side of the second cutting head 116. The fastener may be secured at either bushing, either by a separate nut, threads integrated into the bushing, or other methods of attachment (e.g., pins, keys, etc.). The washers 134, 138 may include lock washers such as cupped washers to assist in securing the axle 130. In another embodiment not illustrated, a spring may be positioned between the first bushing or washer 134 and the first cutting head 114 to provide a biasing force that pushes the first and second cutting heads 114, 116 together to improve mating contact between the blades 120, 122 during cutting operations. In other embodiments using a spring, the spring may instead be positioned adjacent to the second cutting head 116.

The tubing cutter 100 further includes a pair of guides 212 coupled to either the first cutting head 114 or the second cutting head 116. In the illustrated embodiment, as shown in FIGS. 1 and 2A, the guides 212 are coupled to the first cutting head 114 by pins or fasteners that pass through each guide 212 and the first cutting head 114. Each guide includes a body 220 that allows for attachment to the first cutting head 114 and a guide arm 224 that extends from the body 220. In the embodiment illustrated in FIG. 2A, the guide arm 224 forms a planar guide surface 226 that is configured to engage or contact the spine fins 230 surrounding the tube 232. By spacing the guides 212 apart from the blades 120, 122 and aligning the guides 212 such that the planar guide surfaces 226 of the guides 212 are co-planar, engagement between the planar guide surfaces 226 and the exterior of the spine fins 230 causes the tubing cutter 110 to be angularly aligned at an approximately right angle (i.e., normal to) the portion of tube 232 being cut. This assists in allowing a cut that is normal to the longitudinal axis of the tube 232, which is especially advantageous when next connecting the cut tube 232 to other tubing or components using a connection technique such as brazing, soldering or crimping.

Figure 2B:
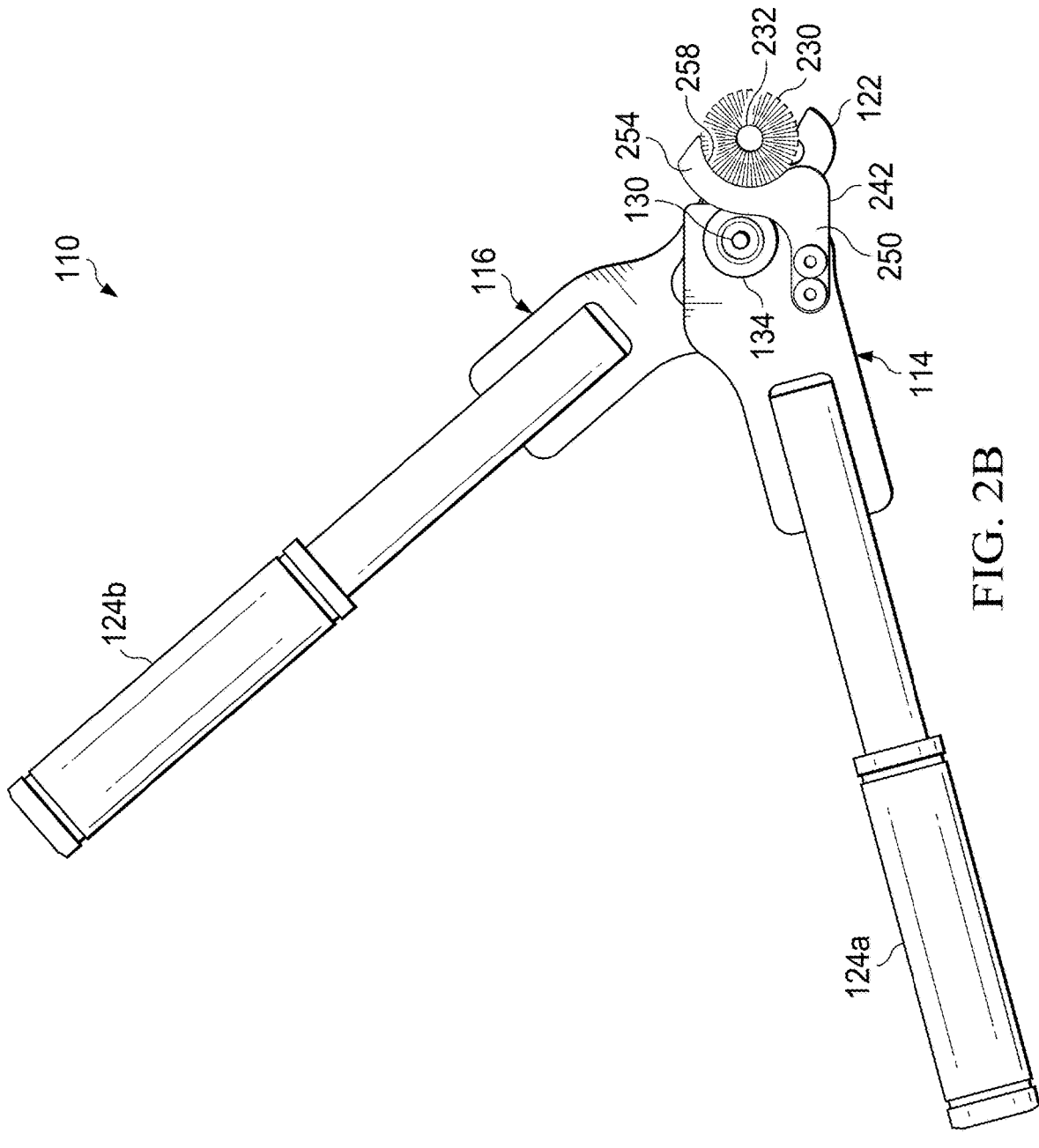
FIG. 2B illustrates a side view of the tubing cutter and spine-fin tubing of FIG. 1, the tubing cutter having an alternative guide with a curved guide surface.

FIG. 2B illustrates a side view of the tubing cutter 100 with an alternative pair of guides 242. In a similar manner, guides 242 are coupled to either the first cutting head 114 or the second cutting head 116. In the illustrated embodiment, the guides 242 are coupled to the first cutting head 114 by pins or fasteners that pass through each guide 242 and the first cutting head 114. Each guide 242 includes a body 250 that allows for attachment to the cutting head 114 and a guide arm 254 that extends from the body 250. In the embodiment illustrated in FIG. 2A, the guide arm 254 has an arcuate shape forming a guide surface 258 that is sized and shaped to match an exterior of the spine fins 230 surrounding the tube 232. In an embodiment, the arcuate guide surface 258 may be concentric to the tube 232 being cut when the cutter is positioned in a partially-closed position around the tube 232. In another embodiment, the arcuate guide surface 258 may be concentric to the exterior of the spine fins 230 when the cutter is positioned in a partially-closed position around the tube 232. In another embodiment, the arcuate guide surface 258 may be concentric to blade edges on either of the cutting heads 114, 116. By spacing the guides 242 apart from the cutting heads 114, 116 and matching the guide surfaces 258 to the exterior of the spine fins 230, the tubing cutter 110 is angularly aligned at an approximately right angle (i.e., normal to) the portion of tube 232 being cut.

Again, this assists in allowing a cut that is normal to the tube 232 and not at an angle, which is advantageous when connecting the cut tube 232 to other tubing or components.

Figure 3:
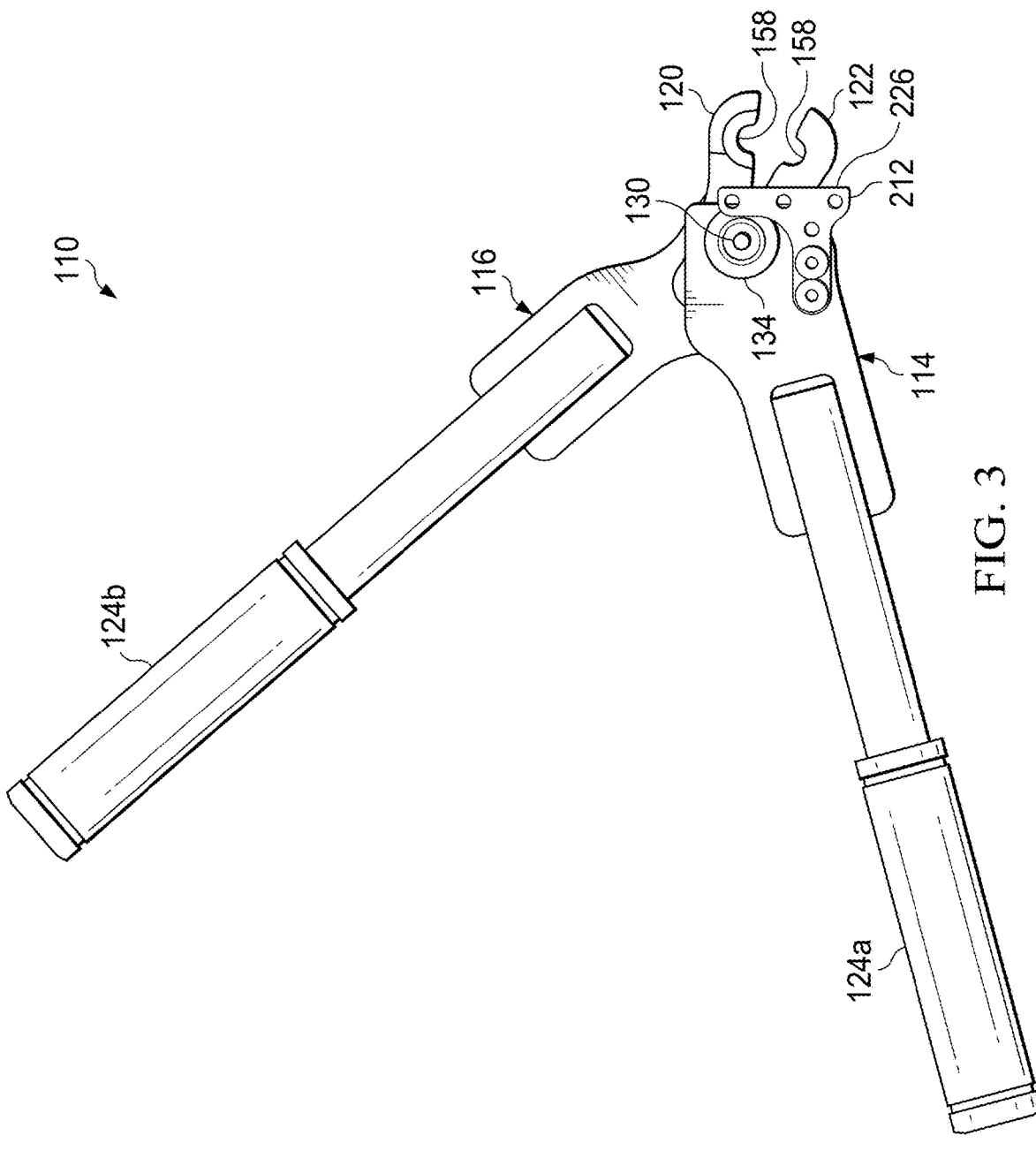
FIG. 3 illustrates a side view of the tubing cutter of FIG. 1 in an open position.
Figure 4:
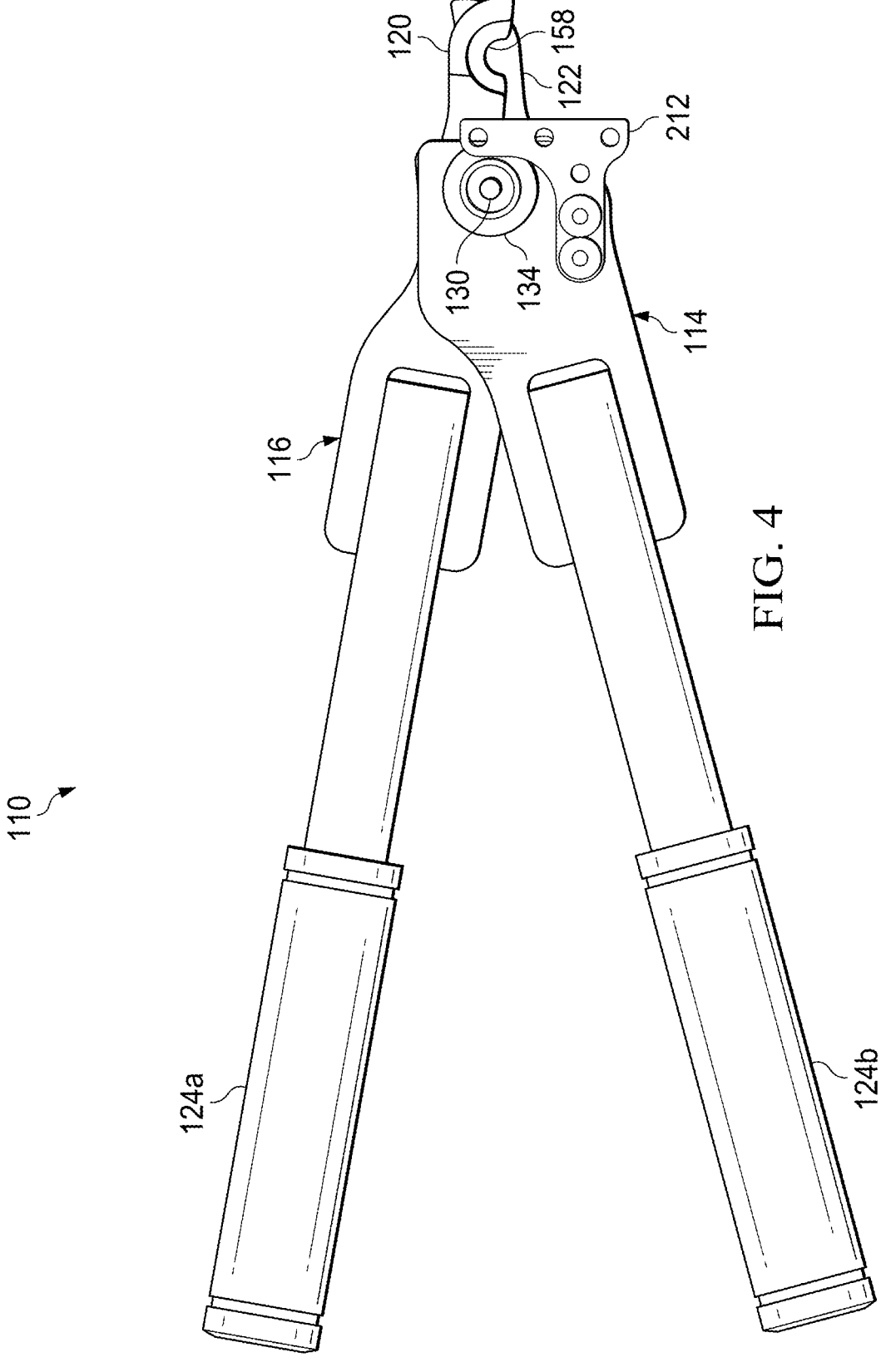
FIG. 4 illustrates a side view of the tubing cutter of FIG. 1 in a closed position.

FIGS. 3 and 4 illustrate side views of the tubing cutter 110 in an open position (FIG. 3) and a closed position (FIG. 4). In the open position, the blades 120, 122 of the cutting head 114, 116, respectively, are opened, allowing the tubing cutter to be moved into engagement with a length of spine-fin tubing such that the guide surface 226 is in contact with the spine fins and each blade 122, 122 is positioned on opposite sides of the tube.

Figure 5:
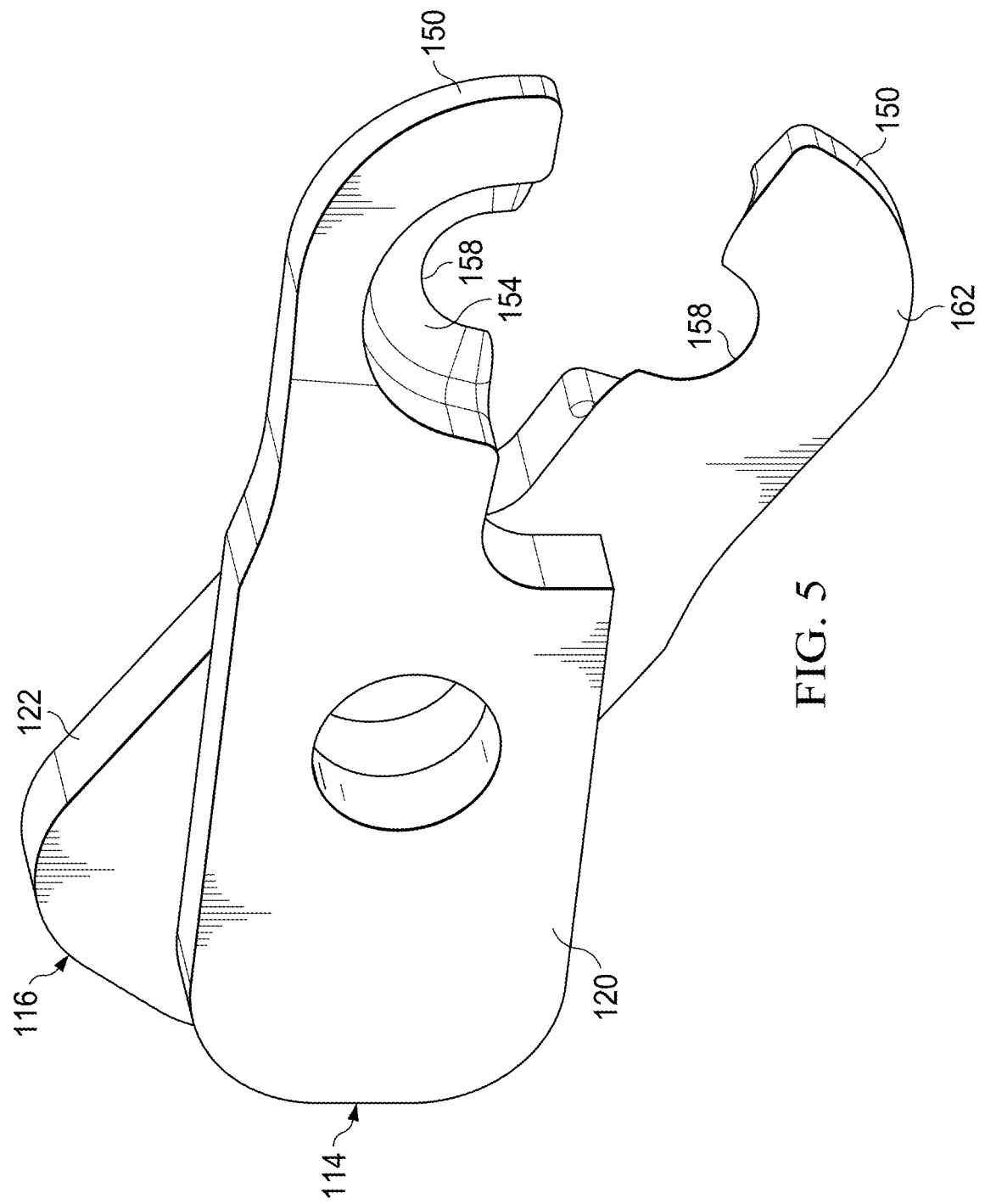
FIG. 5 illustrates an isometric view of a pair of cutter heads arranged in an open position according to an illustrative embodiment.

FIG. 5 illustrates an isometric view of the blade 120 of the first cutting head 114 and the blade 122 of the second cutting head 116 in the open position. Each of the blades 120, 122 includes a rounded nose 150, a bowl region 154, and a blade edge 158. While the blades 120, 122 may be forged or molded, it is also possible to machine the blade 120 from a solid block of material, preferably metal, ceramic or another material capable of providing and maintaining a sharp and hardened blade edge 158. The rounded nose 150 permits the tubing cutter 110 to be gently inserted into the spine fins 230 prior to cutting the tube 232. The bowl region 154 is a region of the blade 120, 122 that tapers down from the thicker portions of the blades 120, 122 to the sharpened blade edge 158.

Preferably the blade edge 158 is sharpened at an angle of approximately 15 degrees relative to a back surface 162 of each blade 120, 122. In other embodiments, the sharpening angle may be greater or less than 15 degrees. In an embodiment, the back surface 162 of each blade 120, 122 is preferably planar such that the blades 120, 122 mate closely together, thereby bringing the blade edges 158 of the respective blades 120, 122 closer together for a cleaner cut.

Figure 6:
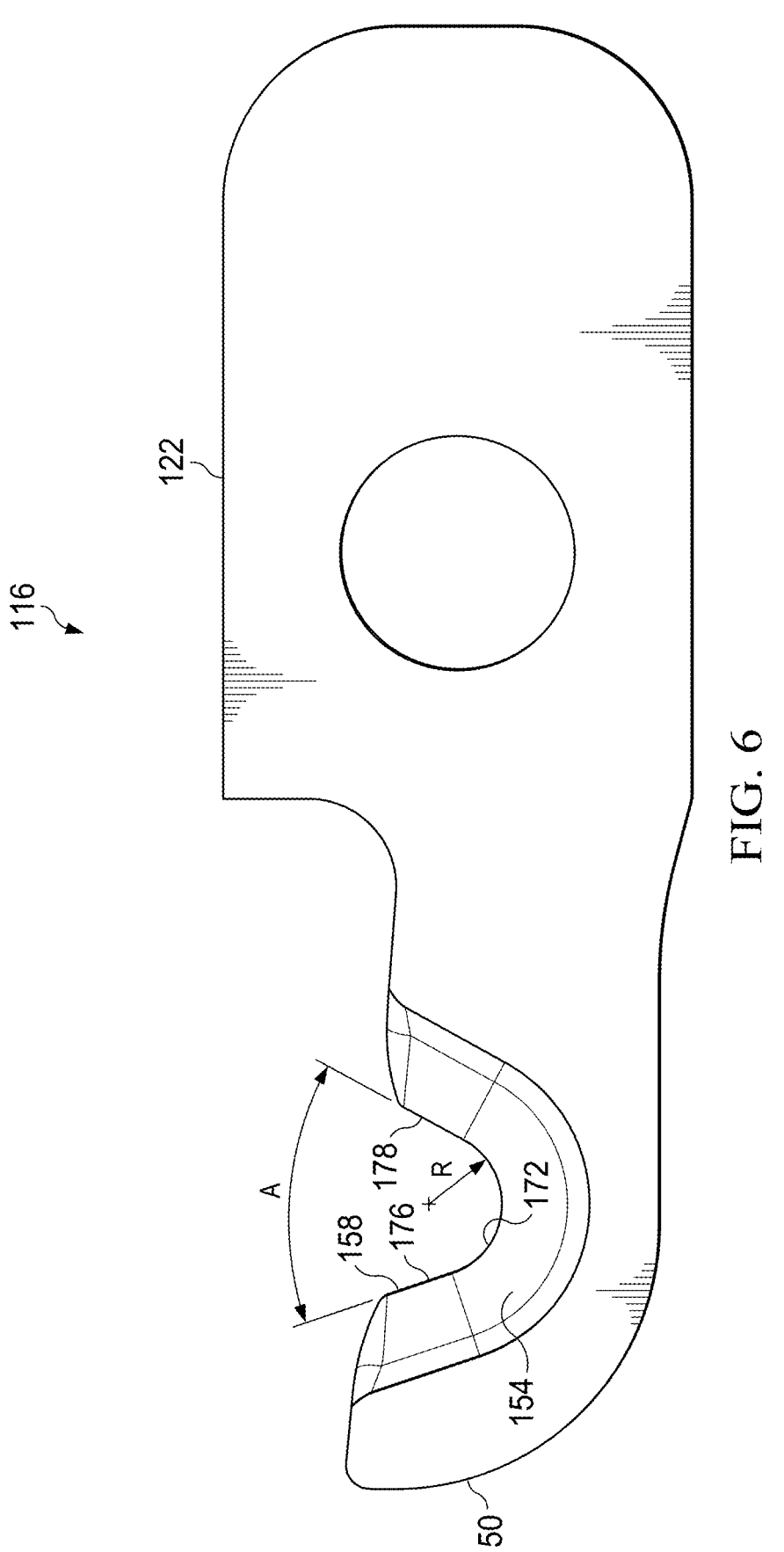
FIG. 6 illustrates a side view of one of the cutter heads of FIG. 5.

FIG. 6 illustrates a side view of the blade 122 to better illustrate the geometry of the blade edge 158. While the shape and dimensions of the blade edge 158 may vary, especially based on the size or shape of the tubing being cut, in the illustrated embodiment, the blade edge 158 includes an arcuate portion 172 with a radius R that is less than an outer radius of the spine-fin tubing to be cut. The blade edge 158 also includes a first linear portion 176 and a second linear portion 178 on opposing sides of the arcuate portion 172. The first and second linear portions 176, 178 are arranged at an angle A to one another that is greater than zero degrees. In one embodiment, the angle A may be greater than about 25 degrees, while the angle may in some embodiments be between about 40 degrees and about 50 degrees. In one preferred embodiment, the angle A may be about 47 degrees. It has been determined through empirical tests that this particular angle produces a much improved cut of the tube with minimal deformation.

Figure 7:
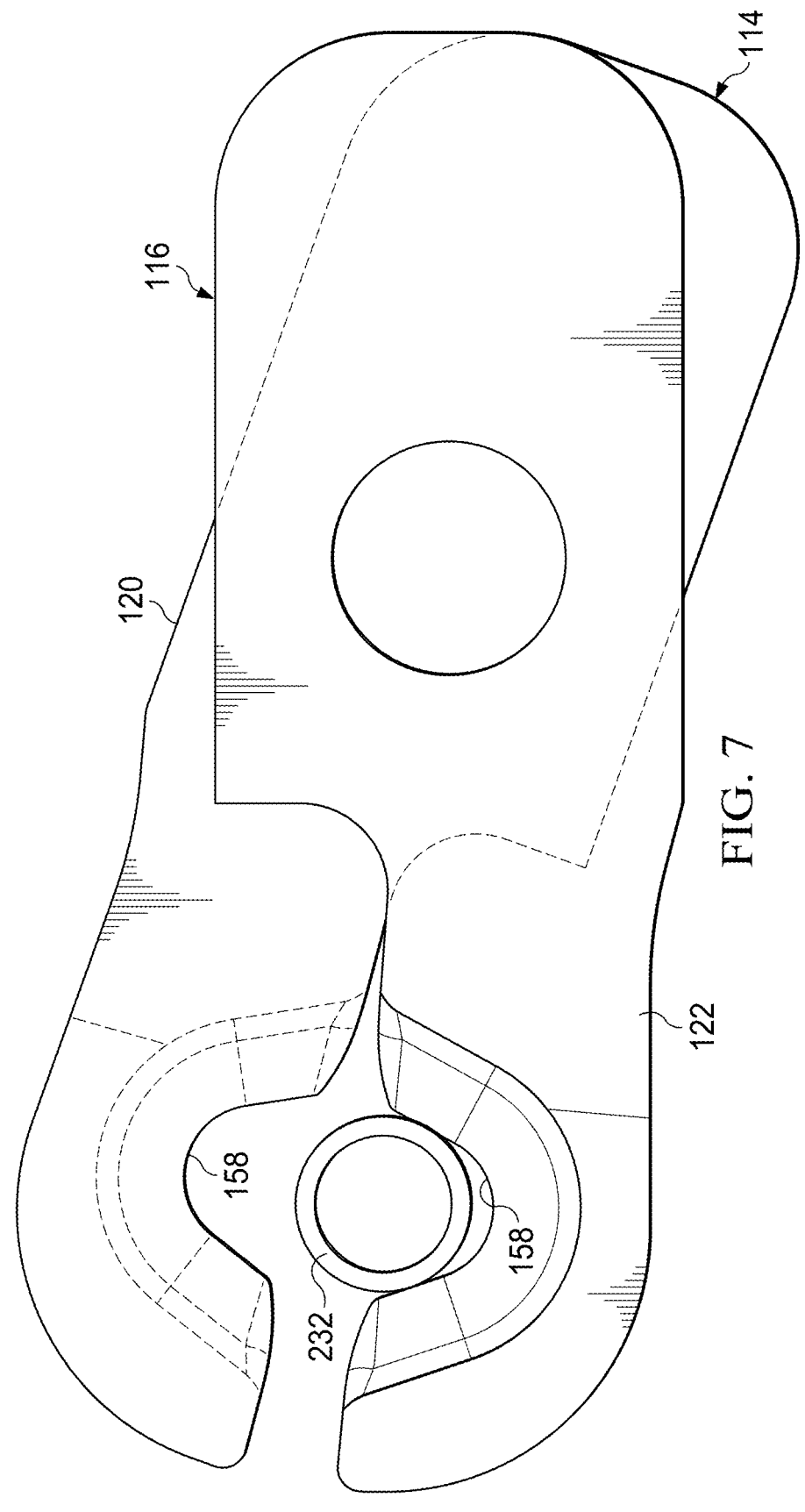
FIG. 7 illustrates a side view of the pair of cutter heads of FIG. 5, arranged in an open position and positioned proximate a tube.
Figure 8:
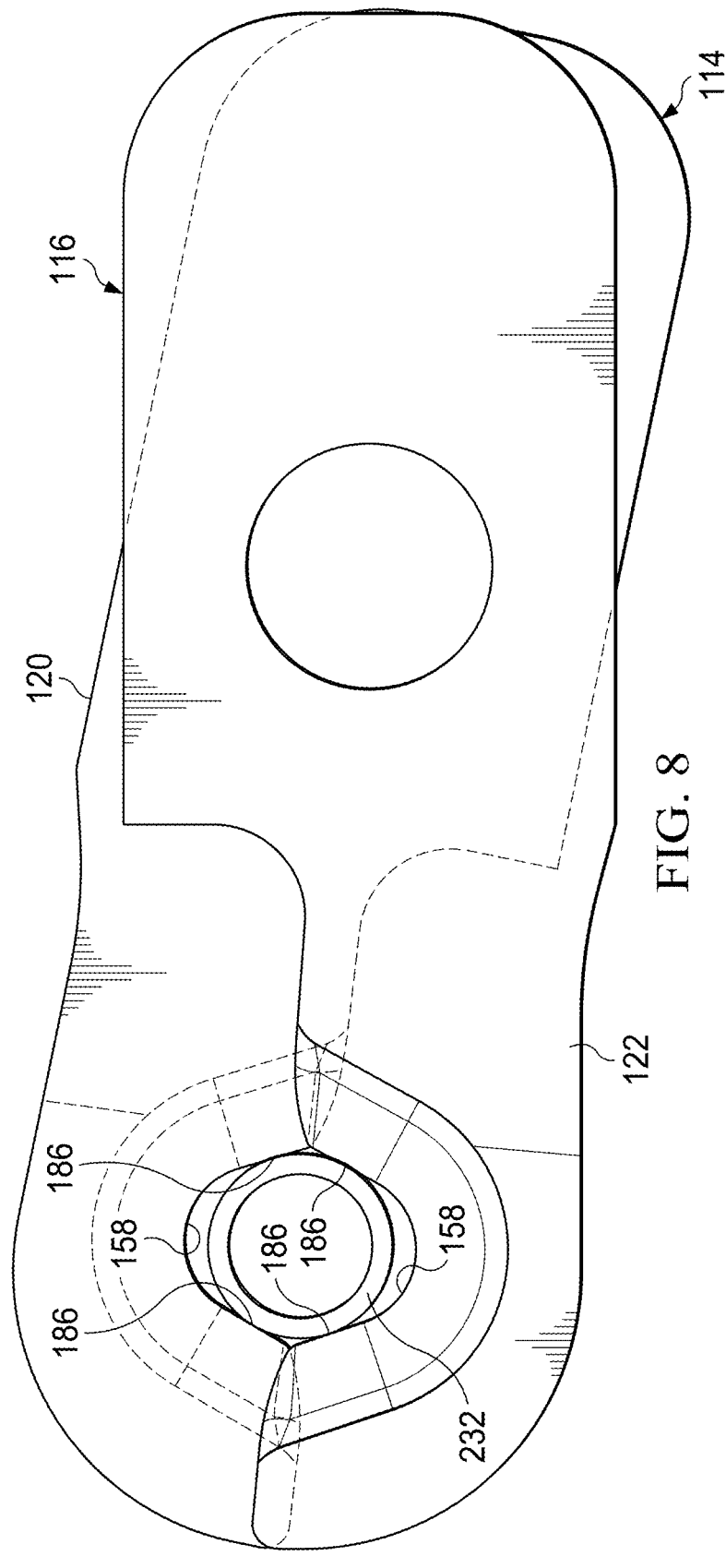
FIG. 8 illustrates a side view of the pair of cutter heads of FIG. 7, arranged in an initial contact position with the tube.
Figure 9:
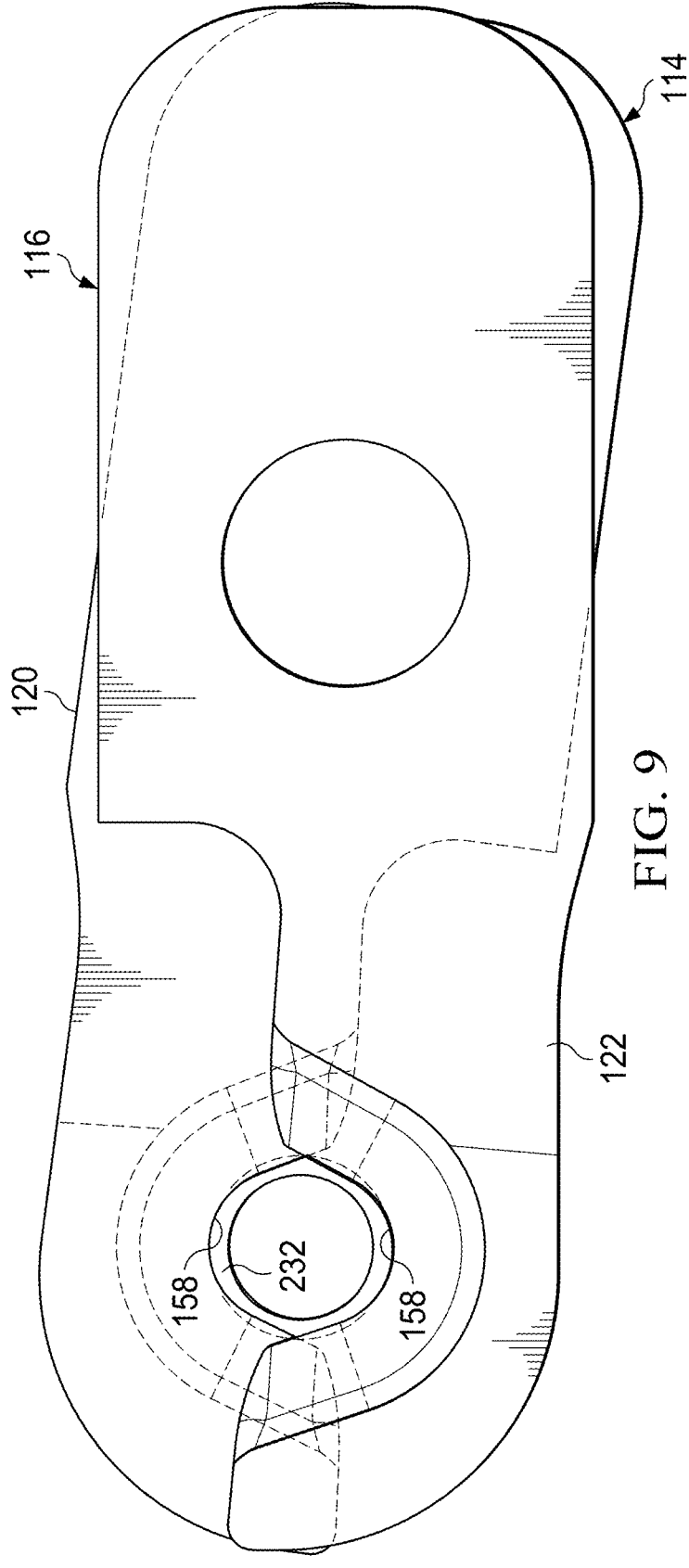
FIG. 9 illustrates a side view of the pair of cutter heads of FIG. 7, arranged in a partially closed position after cutting of the tube has begun.

FIGS. 7-9 illustrate side views of the blades 120, 122 in an open position (FIG. 7), an initial contact position (FIG. 8), and a partially closed position (FIG. 9). The tube 232 of the spine-fin tubing 210 is illustrated proximate the blades 120, 122, and the spine-fins 230 are not shown for purposes of clarity. As previously described, the radius R of the arcuate portion 172 is less than a corresponding outer radius of the tube 232. In many cooling systems, tubing having a ⅜ inch outer diameter is used to route refrigerant through heat exchangers. For use with ⅜ inch tubing, the arcuate portion 172 may be sized with a radius of about 0.15625 inches, which would be half of the diameter of a 5/16 inch tube (i.e., a tube smaller than ⅜ inch). In other words, the arcuate portion 172 in such an example is sized such that it would not allow the ⅜ inch tube to engage an apex of the arcuate portion 172 prior to cutting commencing. It is contemplated that some tubing may be larger or smaller than ⅜ inch and in those situations, a corresponding increase or decrease in the radius R of the arcuate portion 172 may be appropriate.

As shown in FIGS. 7 and 8, the smaller radius R of the arcuate portion 172 relative to the tube 232 and the presence of the linear portions 176, 178 assists in positioning the tube properly relative to the blade edges 158 and also creates discrete points of initial contact 186 between the tube 232 and blade edges 158 (see FIG. 8). The gapping that exists between the tube 232 and the smaller arcuate portion 172 results in the initial points of contact 186 occurring generally between the tube 232 and the linear portions 176, 178 of the blade edge 158. Alternatively, the initial points of contact 186 may fall at or near the intersection of the linear portions 176, 178 and the arcuate portion 172 of the blade edge 158. Preferably, each of the blade edges 158 first contacts the tube at two points of contact. These discreet points of contact create a shearing effect as the blade edges 158 continue to move toward each other, and result in a cleaner cut with less deformation of the tube 232. The smaller radius of the arcuate portion 172 allows the tubing to be cradled and properly aligned between the blade edges 158 prior to the beginning of the cut, and this smaller radius also prevents the tube 232 from having uniform and simultaneous contact with the entire arcuate portion 172. It is believed that by delaying contact between the tube 232 and the arcuate portion 172 until after cutting has commenced at the points of initial contact 186, the resulting cut is cleaner and experiences less deformation of the round profile of the tube 232.

While it is believed that a higher quality cut of the tubing is obtained when the blades edges 158 have the profiles described above, in other embodiments, changes to the blade edges 158 may be made that still result in a high-quality cut. For example, in one embodiment the linear portions 176, 178 of the blade edges 158 may instead be replaced by non-linear geometries, such as for example by having an arcuate geometry that has a different radius from that of the arcuate portion 172. In another embodiment, the arcuate portion 172 may be omitted and the two linear portions 176, 178 may converge at an apex. If the tubing to be cut is provided in a non-round shape, for example in an oval shape, the blade edges 158 may have a profile with an arcuate portion that more closely matches the oval profile. By configuring the tubing cutter 110 with removable blades 120, 122, multiple options exist for exchanging blades and matching the size and shape of the blade edges 158 to the tube that is desired to be cut.

While most of the materials comprising the tubing cutter 110 are constructed from metal, it is of course possible that portions of the tubing cutter 110 may be made from alternative materials including, without limitation, polymers, carbon fiber, ceramics, or other suitable materials. Some of the components made include composites or alloys, or may be constructed from multiple materials. For example, the handles 124a, 124b of the tubing cutter 110 may have an elastomer or rubber overlay that is positioned over a more rigid body of the handle.

In operation, the tubing cutter 110 is rotated to the open position illustrated in FIG. 3 prior to engaging the tubing. For tubing that has spine fins 230 such as that illustrated in FIGS. 1, 2A and 2B, the tubing cutter 110 may be moved into engagement with the tubing such that the guide surfaces 226 or guide surfaces 258 come into contact with the exterior of the spine fins 230 as shown in FIGS. 1, 2A and 2B. While approaching and engaging the spine fins 230, the rounded noses 150 of the blades 120, 122 may be pushed through adjacent spine fins 230 without removing the spine fins 230 from the tube 232. In the open position, after engaging the exterior of the spine fins 230 with the guide surfaces 226 or 258, the blade edges 158 are in proximity to, but not necessarily touching the tube 232 itself. At this stage, the tubing cutter 110 is properly aligned to make a straight cut (see also FIG. 7).

The tubing cutter 110 can then be moved to the initial contact position in which the initial points of contact 186 are made between the tube 232 and the blades 120, 122 as shown in FIG. 8. As the blades 120, 122 are advanced to a partially-closed position (see FIG. 9), the blade edges 158 first begin cutting the tube 232 at the initial points of contact 186. By holding the tube 232 stationary between the blade edges 158 and having these initial points of contact 186, a shearing force is created as the cuts begin that improves the quality of the cut and lessens the likelihood of deformation. The pair of opposed blade edges 158 continue to move toward one another and advance through the tube until the blades 120, 122 are in the closed position (see FIG. 4), at which point the tube 232 is fully cut.

It should be understood that the movement of the blades 120, 122 between the open position and the closed position may be a steady, continuous motion that does not pause at the initial contact position or the partially-closed position, especially when the guide surfaces 226, 258 are used to align the tubing cutter 110 against the spine fins 230 extending radially outward from the tube 232. The guide surfaces 226, 258 not only ensure a straight cut (i.e., at a normal orientation to the tube 232), but also help ensure initial alignment of the tube 232 with that the blade edges 158 before the tube 232 is cradled by the blade edges 158 as the blades 120, 122 approach the initial contact position.

The tubing cutter and related methods described herein improve the cutting of tubing and also the manufacturing and assembly of heat exchangers using spine-fin tubing. The following examples represent additional embodiments of the tubing cutter and related methods of cutting spine-fin tubing and coupling a header tube to spine-fin tubing.

Example 1. A tubing cutter is configured to cut spine-fin tubing, and the tubing cutter includes a pair of cutting heads pivotally connected and movable between an open position and a closed position; wherein each cutting head includes a blade edge having an arcuate portion with a radius less than an outer radius of a tube of the spine-fin tubing.

Example 2. The tubing cutter of example 1, wherein the blade edge further includes a pair of linear portions, the linear portions located on opposing ends of the arcuate portion; and an angle between the first and second non-arcuate portions that is greater than zero degrees.

Example 3. The tubing cutter of example 2, wherein the angle is greater than about 25 degrees.

Example 4. The tubing cutter of example 2, wherein the angle is between about 40 degrees and about 50 degrees.

Example 5. The tubing cutter of example 2, wherein the angle is about 47 degrees.

Example 6. The tubing cutter of any of examples 1-5, wherein the cutting heads, in an initial contact position with the tube, have four discrete initial points of contact with the tube.

Example 7. The tubing cutter of any of examples 1-6, further including a guide coupled to one of the cutting heads, the guide having a guide surface configured to engage a plurality of fins radially extending from the tube; and wherein the guide surface is planar.

Example 8. The tubing cutter of any of examples 1-6 further including a guide coupled to one of the cutting heads, the guide having a guide surface configured to engage a plurality of fins radially extending from the tube; and wherein the guide surface is a curved surface and in use is concentric to at least one of an exterior of the fins, the tube, and the blade edges of the first blade and the second blade.

Example 9. The tubing cutter of any of examples 1-8 further including a pair of handles, each handle coupled to one of the pair of cutting heads.

Example 10. The tubing cutter of any of examples 1-9, wherein each cutting head includes a body and a blade that are removably coupled, the blade edge disposed on the blade.

Example 11. The tubing cutter of example 10, wherein the blade of each of the cutting heads includes a rounded nose and a bowl region that tapers to the blade edge.

Example 12. A tubing cutter configured to cut spine-fin tubing, the tubing cutter including a first cutting head pivotally coupled to a second cutting head, each of the first cutting head and the second cutting head having a blade edge with an arcuate portion; and a guide coupled to the first cutting head and having a guide surface configured to engage a plurality of fins radially extending from a tube of the spine-fin tubing; wherein the guide aids in alignment of the blade edge with the tube.

Example 13. The tubing cutter of example 12, wherein the guide surface is planar.

Example 14. The tubing cutter of example 12, wherein the guide surface is a curved surface and in use is concentric to at least one of an exterior of the fins, the tube, and the blade edges of the first cutting head and the second cutting head.

Example 15. The tubing cutter of any of examples 12-14 further including a first handle coupled to the first cutting head; and a second handle coupled to the second cutting head.

Example 16. The tubing cutter of any of examples 12-15 further including a spring operably associated with the first cutting head and the second head to provide a biasing force pushing the blade edges of the first cutting head and the second cutting head into engagement with one another.

Example 17. The tubing cutter of any of examples 12-16, wherein each of the first and second cutting heads includes a body and a blade that are removably coupled, the blade edge disposed on the blade.

Example 18. The tubing cutter of example 17, wherein the blade of each of the cutting heads includes a rounded nose and a bowl region that tapers to the blade edge.

Example 19. A method of cutting spine-fin tubing having a tube with a plurality of fins extending radially outward from the tube. The method includes positioning a guide of a tubing cutter along an exterior of the plurality of fins to align a pair of opposing blade edges relative to the tube; moving the blade edges toward the tubing such that the blade edges contact the tube in four initial points of contact prior to cutting the tube; and cutting the tubing with the blade edges.

Example 20. A method of cutting spine-fin tubing having a tube with a plurality of fins extending radially outward from the tube. The method includes aligning a pair of opposing blade edges relative to the tube; moving the blade edges toward the tubing such that the blade edges contact the tube in four initial points of contact prior to cutting the tube; and cutting the tubing with the blade edges.

Example 21. A method of coupling a header tube to spine-fin tubing having a plurality of fins extending radially outward from a tube of the spine-fin tubing. The method includes positioning a guide of a tubing cutter along an exterior of the plurality of fins to align a pair of opposing blade edges relative to the tube of the spine-fin tubing; cutting the tube of the spine-fin tubing with a blade edge of the tubing cutter; moving the header tube into contact with a freshly cut edge of the tube of the spine-fin tubing; and crimping the header tube to the tube of the spine-fin tubing.

Example 22. A method of coupling a header tube to spine-fin tubing having a plurality of fins extending radially outward from a tube of the spine-fin tubing. The method includes aligning a pair of opposing blade edges relative to the tube of the spine-fin tubing; cutting the tube of the spine-fin tubing with a blade edge of the tubing cutter; moving the header tube into contact with a freshly cut edge of the tube of the spine-fin tubing; and crimping the header tube to the tube of the spine-fin tubing.

Although the present disclosure and its advantages have been described in detail, it should be understood that various changes, substitutions and alterations may be made herein without departing from the spirit and scope of the disclosure as defined by the following claims.

What is claimed is:

1. A tubing cutter configured to cut spine-fin tubing, the tubing cutter comprising:
   a pair of cutting heads pivotally connected and movable between an open position and a closed position;
   wherein each cutting head includes a blade edge having an arcuate portion with a radius less than an outer radius of a tube of the spine-fin tubing;
   wherein the blade edge further comprises:
      a pair of linear portions, the linear portions located on opposing ends of the arcuate portion; and
      an angle between the pair of linear portions that is greater than zero degrees.

2. The tubing cutter of claim 1, wherein the angle is greater than about 25 degrees.

3. The tubing cutter of claim 1, wherein the angle is between about 40 degrees and about 50 degrees.

4. The tubing cutter of claim 1, wherein the angle is about 47 degrees.

5. The tubing cutter of claim 1, wherein the cutting heads, in an initial contact position with the tube, have four discrete initial points of contact with the tube.

6. The tubing cutter of claim 1 further comprising:
   a guide coupled to one of the cutting heads, the guide having a guide surface configured to engage a plurality of fins radially extending from the tube;
   wherein the guide surface is planar.

7. The tubing cutter of claim 1 further comprising:
   a guide coupled to one of the cutting heads, the guide having a guide surface configured to engage a plurality of fins radially extending from the tube;
   wherein the guide surface is a curved surface and in use is concentric to at least one of an exterior of the fins, the tube, and the blade edges of the first blade and the second blade.

8. The tubing cutter of claim 1 further comprising:
   a pair of handles, each handle coupled to one of the pair of cutting heads.

9. The tubing cutter of claim 1, wherein each cutting head includes a body and a blade that are removably coupled, the blade edge disposed on the blade.

10. The tubing cutter of claim 9, wherein the blade of each of the cutting heads includes a rounded nose and a bowl region that tapers to the blade edge.

11. A tubing cutter configured to cut spine-fin tubing, the tubing cutter comprising:

a first cutting head pivotally coupled to a second cutting head, each of the first cutting head and the second cutting head having a blade edge with an arcuate portion;

wherein each of the first and second cutting heads includes a body and a blade that are removably coupled, the blade edge disposed on the blade; and wherein the blade of each of the cutting heads includes a rounded nose and a bowl region that tapers to the blade edge.

12. The tubing cutter of claim 11, further comprising:

a guide coupled to the first cutting head and having a guide surface configured to engage a plurality of fins radially extending from a tube of the spine-fin tubing;

wherein the guide aids in alignment of the blade edge with the tube; and wherein the guide surface is planar.

13. The tubing cutter of claim 11, further comprising:

a guide coupled to the first cutting head and having a guide surface configured to engage a plurality of fins radially extending from a tube of the spine-fin tubing;

wherein the guide aids in alignment of the blade edge with the tube; and wherein the guide surface is a curved surface and in use is concentric to at least one of an exterior of the fins, the tube, and the blade edges of the first cutting head and the second cutting head.

14. The tubing cutter of claim 11 further comprising:

a first handle coupled to the first cutting head; and a second handle coupled to the second cutting head.

15. The tubing cutter of claim 11 further comprising:

a spring operably associated with the first cutting head and the second head to provide a biasing force pushing the blade edges of the first cutting head and the second cutting head into engagement with one another.

16. A method of coupling a header tube to spine-fin tubing having a plurality of fins extending radially outward from a tube of the spine-fin tubing, the method comprising:

positioning a guide of a tubing cutter along an exterior of the plurality of fins to align a pair of opposing blade edges relative to the tube of the spine-fin tubing;

cutting the tube of the spine-fin tubing with a blade edge of the tubing cutter;

moving the header tube into contact with a freshly cut edge of the tube of the spine-fin tubing; and crimping the header tube to the tube of the spine-fin tubing.

17. A tubing cutter configured to cut spine-fin tubing, the tubing cutter comprising:

a pair of cutting heads pivotally connected and movable between an open position and a closed position;

wherein each cutting head includes a blade edge having an arcuate portion with a radius less than an outer radius of a tube of the spine-fin tubing;

wherein each cutting head includes a body and a blade that are removably coupled, the blade edge disposed on the blade; and wherein the blade of each of the cutting heads includes a rounded nose and a bowl region that tapers to the blade edge.

18. A tubing cutter configured to cut spine-fin tubing, the tubing cutter comprising:

a first cutting head pivotally coupled to a second cutting head, each of the first cutting head and the second cutting head having a blade edge with an arcuate portion;

a spring operably associated with the first cutting head and the second head to provide a biasing force pushing the blade edges of the first cutting head and the second cutting head into engagement with one another.

* * * * *